(12) United States Patent
Cruz

(10) Patent No.: US 11,972,067 B2
(45) Date of Patent: Apr. 30, 2024

(54) HANDHELD WIRELESS POINTING DEVICE NOT REQUIRING FLAT SURFACE

(71) Applicant: Tiffany Cruz, Squamish (CA)

(72) Inventor: Tiffany Cruz, Squamish (CA)

(73) Assignee: Tiffany A. Cruz

( * ) Notice: Subject to any disclaimer, the term of this patent is extended or adjusted under 35 U.S.C. 154(b) by 0 days.

(21) Appl. No.: 18/094,390

(22) Filed: Jan. 8, 2023

(65) Prior Publication Data

US 2023/0221812 A1 Jul. 13, 2023

Related U.S. Application Data

(60) Provisional application No. 63/297,762, filed on Jan. 9, 2022.

(51) Int. Cl.
| | | |
|---|---|---|
| *G06F 3/033* | (2013.01) | |
| *G06F 3/0354* | (2013.01) | |
| *G06F 3/04812* | (2022.01) | |
| *H04W 4/80* | (2018.01) | |

(52) U.S. Cl.
CPC ...... *G06F 3/03543* (2013.01); *G06F 3/03547* (2013.01); *G06F 3/04812* (2013.01); *H04W 4/80* (2018.02); *G06F 2203/0331* (2013.01)

(58) Field of Classification Search
CPC ............ G06F 3/03543; G06F 3/03547; G06F 3/0383; G06F 3/04812; G06F 2203/0331; G06F 2203/0335; G06F 2203/0384
See application file for complete search history.

(56) References Cited

U.S. PATENT DOCUMENTS

| 10,928,906 B2* | 2/2021 | Balint | G06F 3/016 |
|---|---|---|---|
| 2002/0118167 A1* | 8/2002 | Mei | G06F 1/1616 |
| | | | 345/158 |
| 2002/0186198 A1* | 12/2002 | Coghan, IV | G06F 3/0354 |
| | | | 345/156 |
| 2003/0038783 A1* | 2/2003 | Baughman | G06F 3/03543 |
| | | | 345/163 |
| 2003/0160765 A1* | 8/2003 | Gordon | G06F 3/03543 |
| | | | 345/163 |
| 2003/0214481 A1* | 11/2003 | Xiong | G06F 3/017 |
| | | | 345/157 |
| 2012/0293410 A1* | 11/2012 | Bell | G06F 3/014 |
| | | | 345/158 |
| 2013/0060516 A1* | 3/2013 | Chang | G01C 17/28 |
| | | | 702/151 |

(Continued)

*Primary Examiner* — Joe H Cheng

(57) ABSTRACT

A system for promoting user manipulation of pointing device while operating keyboard is provided. The system comprises a computer, a USB device coupled to the computer, and a handheld wireless pointing device with a first surface positioned against a palm of a user's hand. The device receives tactile contact from a thumb of the hand on a touchpad on a second surface, the second surface opposite the first surface and facing away from the palm. The device also measures movement of the thumb on the second surface and transmits messaging to the USB regarding the measured movement. The USB, based on the received messaging, directs movement of a cursor on a display of the computer. The movement of the cursor is aligned with the movement of the thumb. The device receives attachment to the hand via loops attached to user index and middle fingers.

20 Claims, 8 Drawing Sheets

(56) References Cited

U.S. PATENT DOCUMENTS

2014/0018166 A1\* 1/2014 Guild ................. G07F 17/3206
  463/31
2015/0193023 A1\* 7/2015 Odgers ................ G06F 3/0483
  345/163
2016/0062489 A1\* 3/2016 Li .......................... G06F 3/017
  345/163

\* cited by examiner

HANDHELD WIRELESS POINTING DEVICE NOT REQUIRING FLAT SURFACE

CROSS REFERENCE TO RELATED APPLICATIONS

None

FIELD OF THE DISCLOSURE

The present disclosure is in the field of pointing devices for desktop personal computers, laptop computers, and other electronic devices. More particularly, the present disclosure provides a handheld wireless mouse fitting into a user's hand with a touchpad on a surface facing away from the palm that receives tactile contact with the user's thumb as mouse movements, the contact measured and sent to the associated computer for movement of a cursor on a display in accordance with the thumb movements.

BACKGROUND

The traditional computer pointing device or mouse has seen very limited change in form/function since its introduction. The traditional mouse is a primary function of the computer, enabling the user to navigate the computer screen and includes a "left click" and "right click" function in can include a "wheel" which helps users scroll up and down on the computer screen quickly and smoothly. This structure is limiting to the user's hand as it requires the user to have one hand applied during use. In addition, the traditional mouse is restricted to a two-dimensional plane, which requires the user to have a flat surface and/or mousepad. Traditional mouse functionality requires users to stop typing, remove one hand from the keyboard, and place it onto the mouse to navigate the pointer arrow on the screen.

DETAILED DESCRIPTION

Systems and methods described herein provide a handheld wireless pointing device or mouse that features an onboard touchpad manipulated by a user's thumb. The system allows a user to move the cursor on a display of a computer while not needing to temporarily discontinue typing on the computer's keyboard. Systems provided herein eliminate the need for the user to remove a hand from the keyboard for computer screen navigation, but also allows the user to place their hand anywhere within range of the USB for optimal functionality and usability to direct the arrow and scrolling of the computer screen.

The device fits into the palm of the user's hand and can be manipulated wherever the user may be seated or standing so long as he/she remains in Bluetooth range of a universal serial bus (USB) device plugged into the user's computer. The pointing device hence is no longer a two-dimensional device that must be positioned upon a flat surface to operate.

The user is not restricted to the up/down and left/right movements that a traditional mouse requires. With the system provided herein, the user may place their hand in their lap or wave it in the air. The pointing device provided herein still works in the same manner as a traditional mouse.

The device fits into the user's palm and is held to the palm by hooks or loops that attach the user's index finger and middle finger. The thumb of the same hand may curl underneath the palm and manipulate the touchpad on the surface of the device facing away from the palm.

A user seated at a computer, for example a desktop or laptop computer, who is typing on a keyboard and wishes to move the cursor on the monitor he/she is presently viewing, can move the cursor with his/her thumb. The user can continue typing and not remove his/her hands from the keyboard while manipulating the downward-facing touchpad with his/her thumb.

The system also includes the USB device that is plugged into a USB port of the computer. The handheld device records thumb movements on the touchpad and wirelessly transmits signaling describing the thumb movements to the USB device. The USB device causes the cursor to move on the computer's monitor in accordance with the captured thumb movements.

The device can also allow movement similar to the wheel of a traditional mouse allowing rapid movement up and down through a displayed page or document. The left click button is provided with wheel functionality such that the user may use his/her index finger to rotate or spin the wheel of the left click button to rapidly invoke such wheel functionality.

Figure 1:
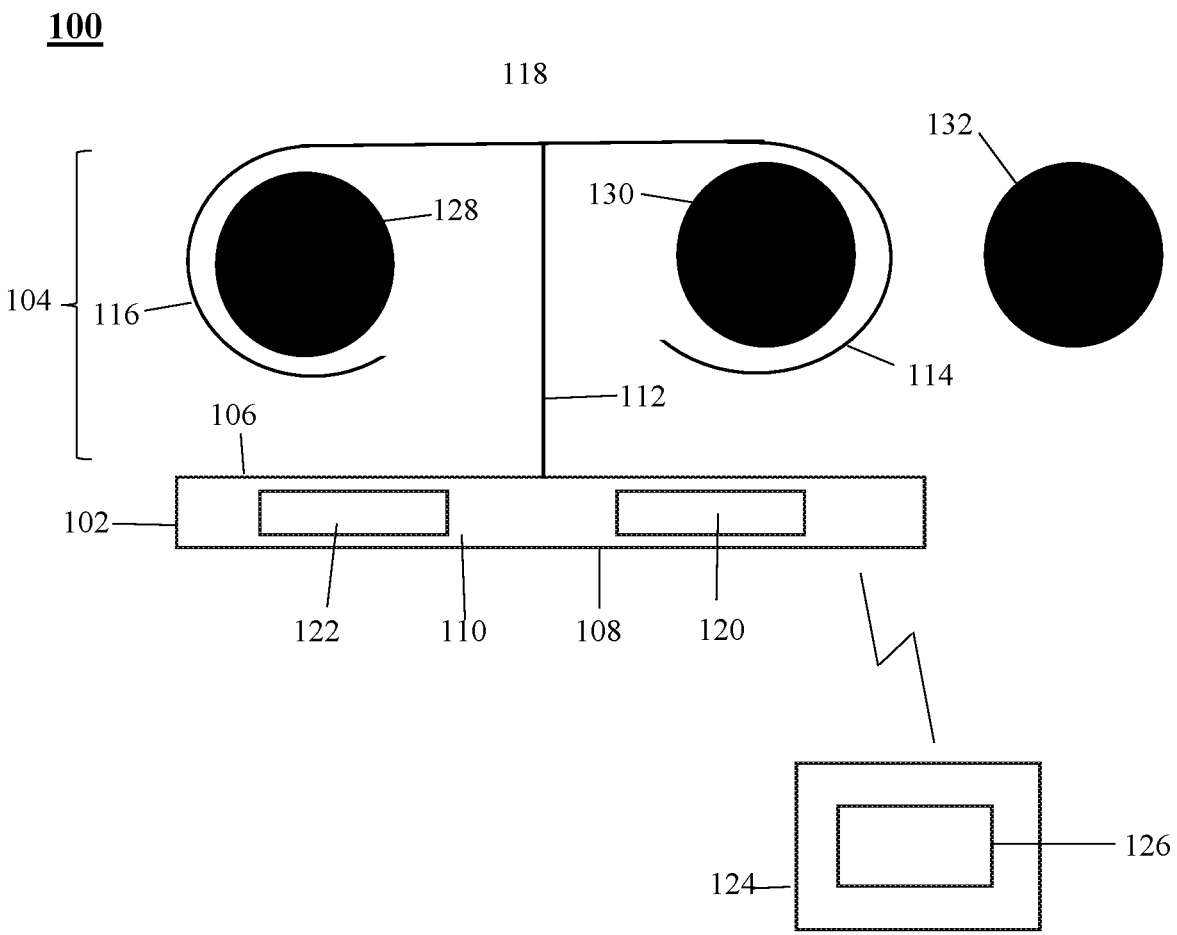
FIG. 1 through FIG. 8 are diagrams of a system of a wireless handheld mouse according to an embodiment of the present disclosure.

Turning to the figures, FIG. 1 is a block diagram of a system of a wireless handheld pointing device according to an embodiment of the present disclosure. FIG. 1 depicts components of a system 100 provided herein.

System 100 comprises a handheld component 102, a bracketing component 104, a palm-facing surface 106, an outer-facing surface 108, and a touchpad 110. System 100 also comprises a stem 112, a middle finger loop 116, an index finger loop 114, and a loop connector 118. System 100 further comprises a left click button 122, a right click button 124, a computer 124, and a USB 126. While not part of the system 100, FIG. 1 also depicts for illustration and discussion purposes a user index finger 128, a user middle finger 130, and a user thumb 132.

The handheld component 102 and the bracketing component 104 are not individual components. Each instead comprises an assembly or group of subcomponents described in detail herein. The bracketing component 104 promotes the handheld component 102 to be attached to a user's index and middle fingers 128, 130 while being held firmly to the palm of the user's hand.

The handheld component 102 may be rectangular or square or otherwise shaped and may be rigid or flexible. The handheld component 102 comprises a palm-facing surface 106 that is held against the user's palm by the bracketing component 104. Opposite from the palm-facing surface 106 is the outer-facing surface 108 which faces away from the user's hand. The outer-facing surface 108 would be facing downward toward a keyboard while the user is typing or otherwise manipulating keys of the keyboard.

The outer-facing surface 108 hosts the touchpad 110 which the user would manipulate with his/her thumb. The user bends or curls his/her thumb underneath his/her palm to touch and manipulate the touchpad 110. The user touches the touchpad 110 with his/her thumb and moves the thumb across the touchpad 110 to manipulate the cursor on a monitor of a computer 124 the user is presently using.

The movements of the thumb are captured by the system 100 and sent wirelessly via Bluetooth to the USB 126. The USB 126 causes the computer 124 to move the cursor on the display of the computer 124.

The bracketing component 104 comprises the stem 112 which is seated on the palm-facing surface 106 and rises up perpendicularly from that surface 106. The loop connector 118 is an optional component and may be connected to the stem 112 perpendicularly in a "T"-shaped manner. The loop connector 118 connects the index finger loop 114 and middle finger loop 116.

FIG. 1 is a front view of the system 100. While not part of the system 100, FIG. 1 depicts and enumerates the user index finger 130, the user middle finger 128, and the user thumb 132.

It bears noting that FIG. 1 depicts the system 100 for right-handed users. The system is configurable to accommodate left-handed users. Whether the user is right-handed or left-handed, the user thumb 132 may curl or bend underneath the handheld component 102 to manipulate the touchpad 110 as described above.

Also depicted in FIG. 1 are the left click button 122, right click button 124 which the user can activate with the system 100 still fully in his/her hand and while typing on the keyboard. As noted, the left click button 122 also provides wheel functionality. The system 100 is rechargeable.

Additional software is not needed on the computer 124 for the functionality provided herein. The USB 126 handles all of the functionality in dealing with the computer 124. Keyboards and pointing devices fall under the USB HID (Human Interface Device) category which has a standardized interface from the hardware.

Figure 2:
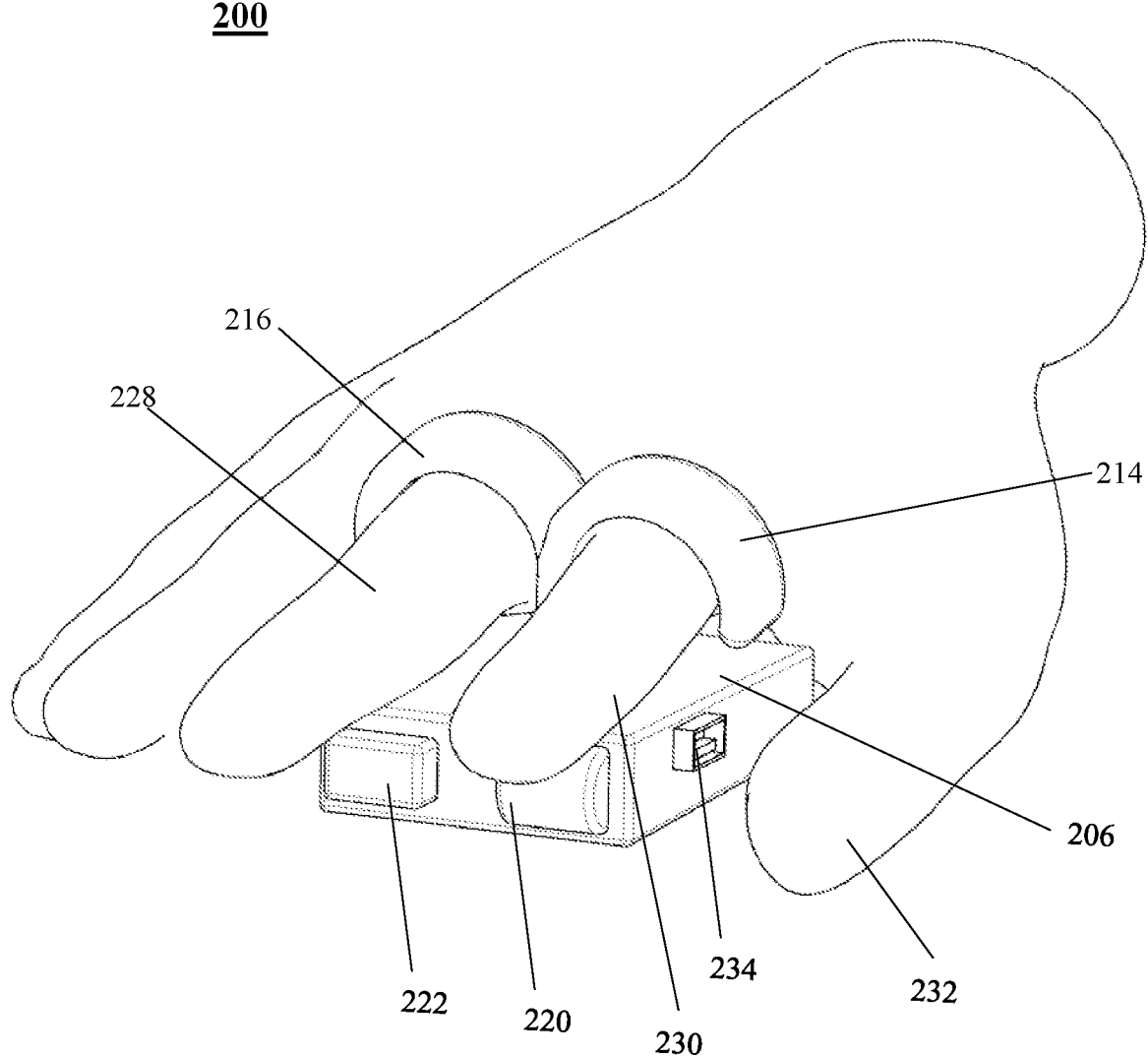

FIG. 2 is a diagram of a wireless handheld mouse according to an embodiment of the present disclosure. Components depicted in FIG. 2 through FIG. 8 are indexed to the components depicted in FIG. 1 and provided by the system 100.

FIG. 2 is an angled front view of a system 200 that matches the system 100. Depicted in FIG. 2 are the palm-facing surface 206, the middle finger loop 216, the index finger 214, the left-click button 220, and the right click button 222. Also shown in FIG. 2 is user index finger 230, user middle finger 228, and user thumb 232.

Newly introduced in FIG. 2 is a power charging port 234. This port 234 may be used with a cable plugged in to an electric wall outlet to recharge the unit 200.

Figure 3:
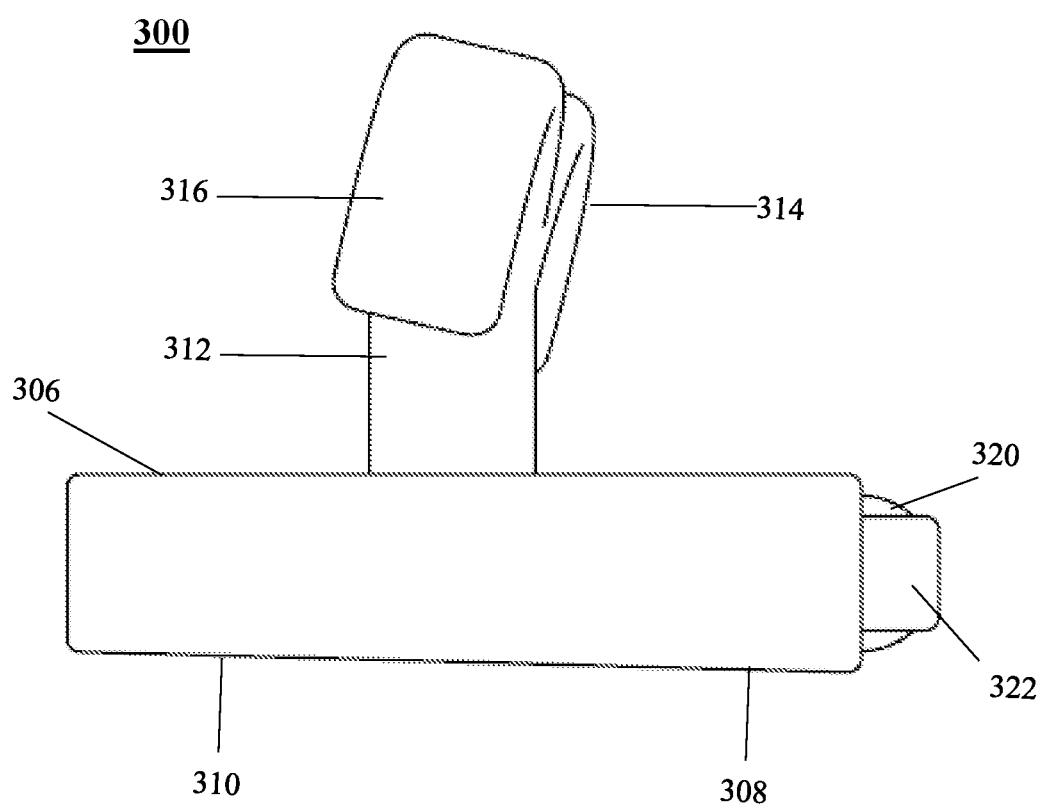

FIG. 3 is a diagram of a wireless handheld mouse according to an embodiment of the present disclosure. A system 300 is provided and depicted in FIG. 3. FIG. 3 is a side view of the system with a forward-facing portion of the mouse on a right side of FIG. 3.

Depicted in FIG. 3 are the palm-facing surface 306, the outer-facing surface 308, the touchpad 310, and the stem 312. Also depicted in FIG. 3 are the middle finger loop 316, the index finger loop 314, the left click button 320, and the right click button 322.

Figure 4:
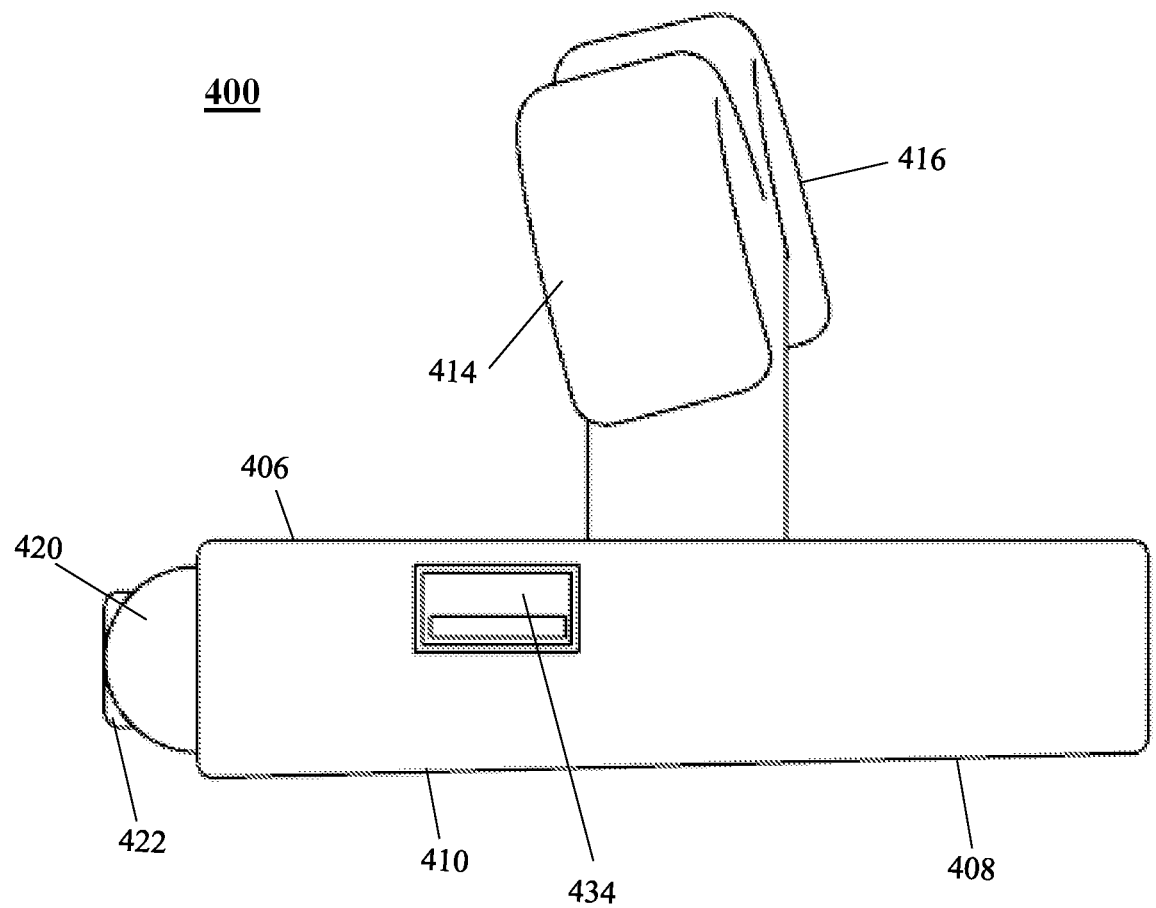

FIG. 4 is a diagram of a wireless handheld mouse according to an embodiment of the present disclosure. A system 400 is provided and depicted in FIG. 4. FIG. 4 is a side view of the system with a front facing portion on a left side of FIG. 4. FIG. 4 depicts the system from the side opposite that shown in FIG. 3.

Depicted in FIG. 4 are the palm-facing surface 406, the outer-facing surface 408, the touchpad 410, and the stem 412. Also depicted in FIG. 4 are the middle finger loop 416, the index finger loop 414, the left click button 420, and the right click button 422. Also shown in FIG. 4 is the power charging port 434.

Figure 5:
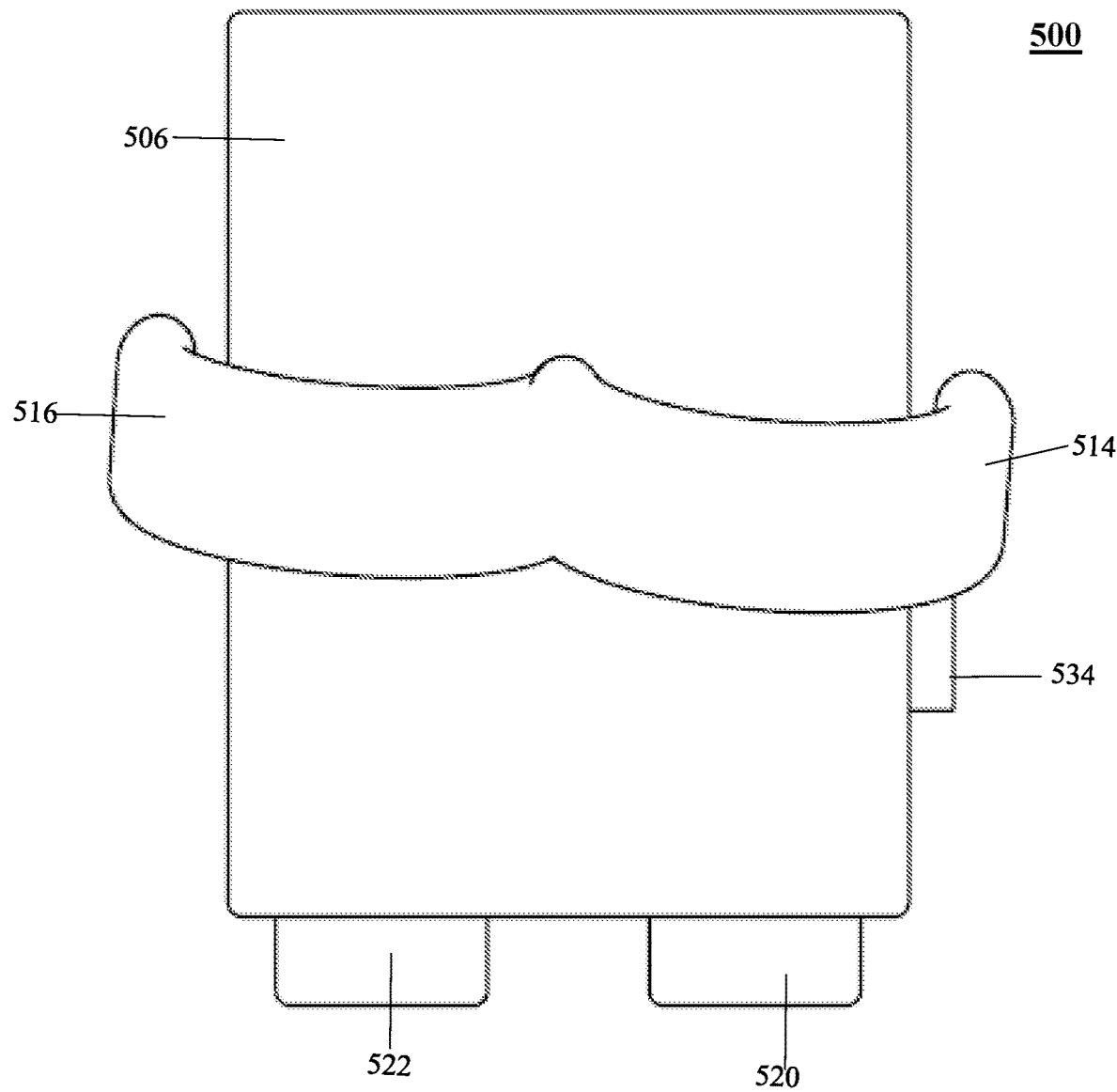

FIG. 5 is a diagram of a wireless handheld mouse according to an embodiment of the present disclosure. A system 500 is provided and depicted in FIG. 5. FIG. 5 is a top view of the system.

Depicted in FIG. 5 are the palm-facing surface 506, the middle finger loop 516, the index finger loop 514, the left click button 520, and the right click button 522. Also shown in FIG. 5 is the power charging port 534.

Figure 6:
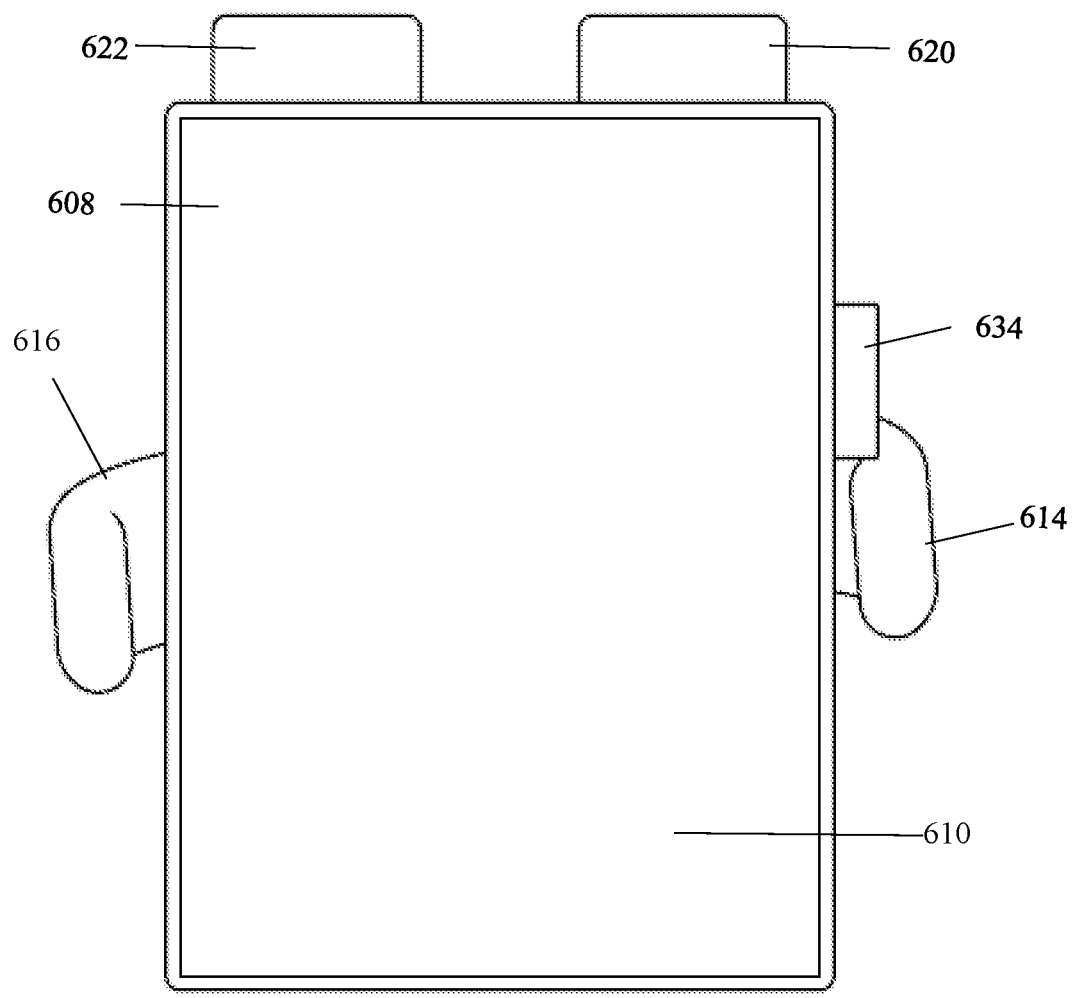

FIG. 6 is a diagram of a wireless handheld mouse according to an embodiment of the present disclosure. A system 600 is provided and depicted in FIG. 6. FIG. 6 is a bottom or underside view of the system.

Depicted in FIG. 6 are the outer-facing surface 608, the touchpad 610, the middle finger loop 616, the index finger loop 614, the left click button 620, and the right click button 622. Also shown in FIG. 6 is the power charging port 634.

Figure 7:
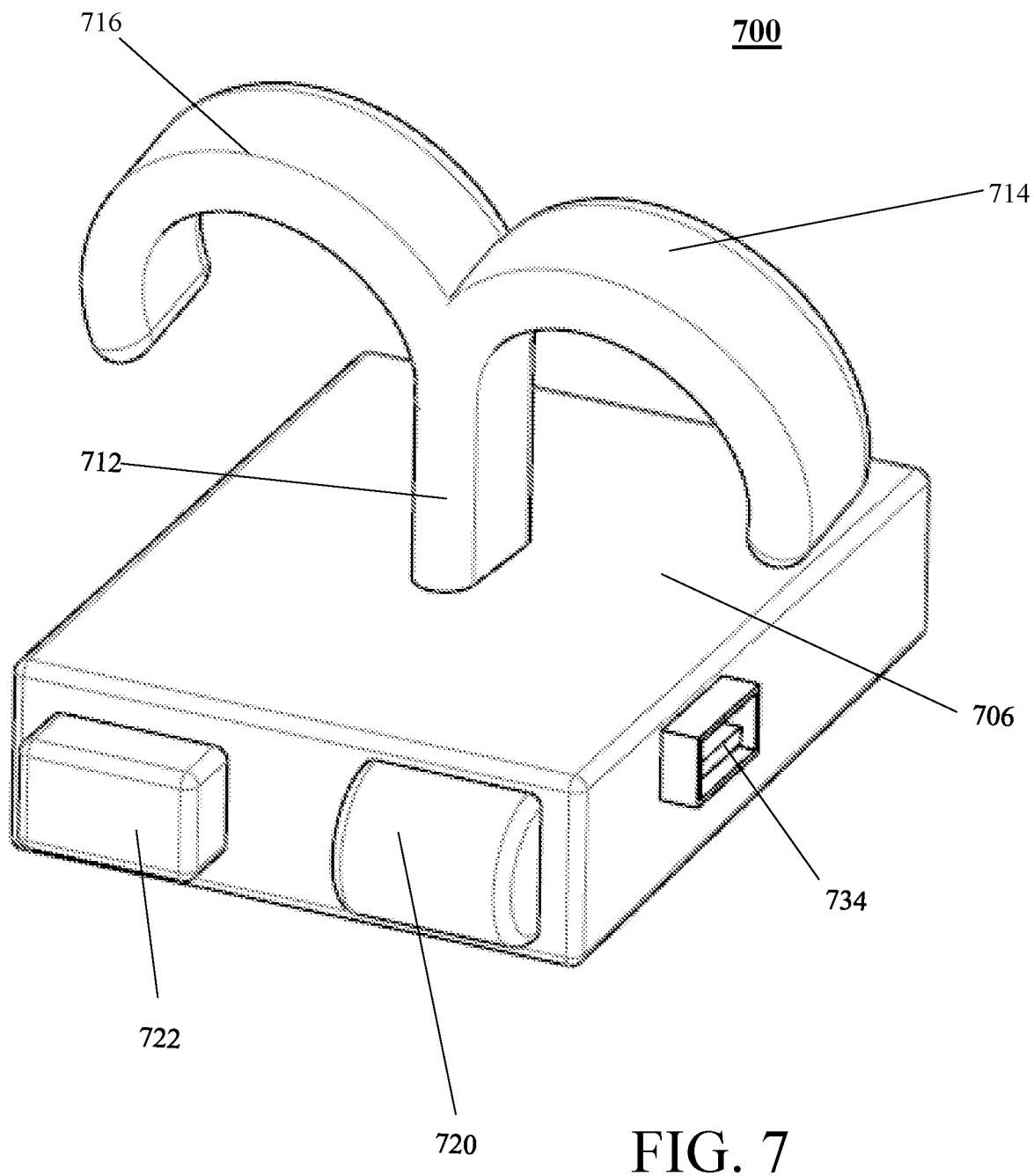

FIG. 7 is a diagram of a wireless handheld mouse according to an embodiment of the present disclosure. A system 700 is provided and depicted in FIG. 7. FIG. 2 is an angled front view of the system similar to FIG. 2 but without the user's hand shown.

Depicted in FIG. 7 are the palm-facing surface 706, the middle finger loop 716, the index finger loop 714, the left click button 720, and the right click button 722. Also shown in FIG. 7 is the power charging port 734.

Figure 8:
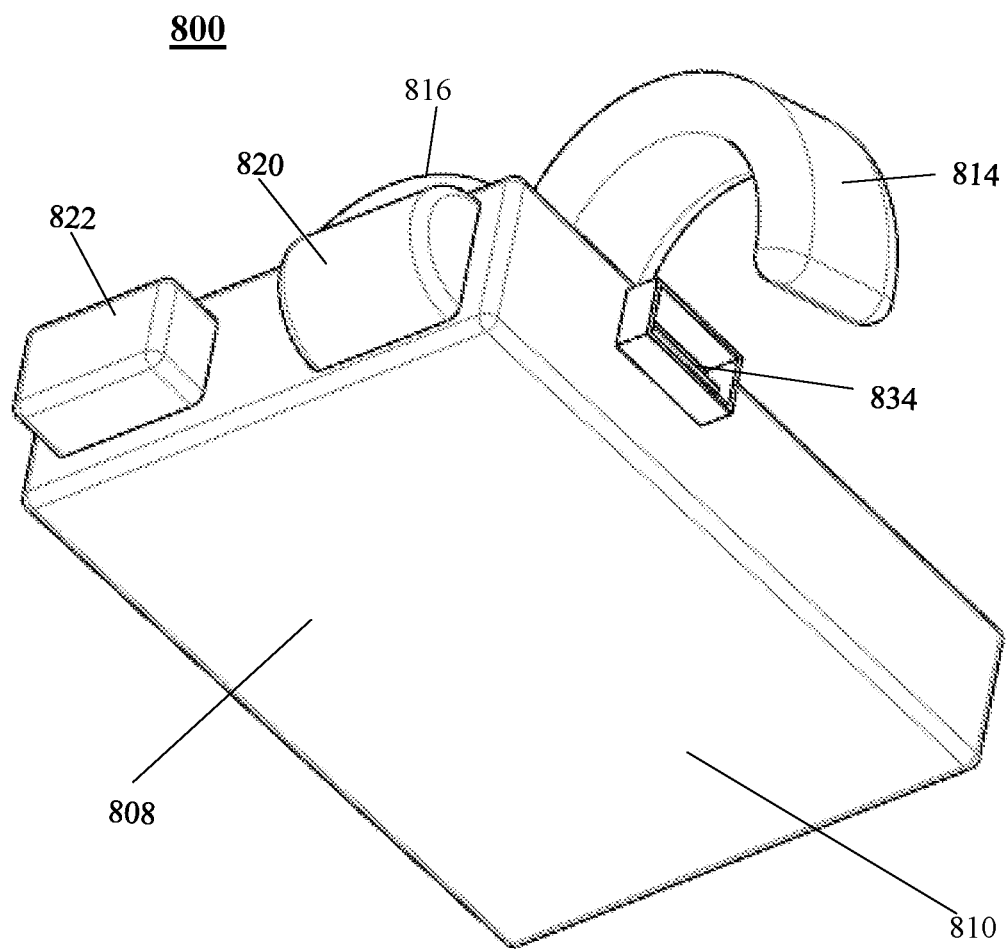

FIG. 8 is a diagram of a wireless handheld mouse according to an embodiment of the present disclosure. A system 800 is provided and depicted in FIG. 8. FIG. 8 is an angled bottom or underside view of the system somewhat similar to the system 600 depicted in FIG. 6.

Depicted in FIG. 8 are the outer-facing surface 808, the touchpad 810, the middle finger loop 816, the index finger loop 814, the left click button 820, and the right click button 822. Also shown in FIG. 8 is the power charging port 834.

In an embodiment, a system for promoting user manipulation of pointing device while operating keyboard is provided. The system comprises a computer, a universal serial bus (USB) device coupled to the computer, and a handheld wireless pointing device with a first surface positioned against a palm of a user's hand. The handheld device receives tactile contact from a thumb of the hand on a touchpad on a second surface, the second surface opposite the first surface and facing away from the palm. The handheld device also measures movement of the thumb on the second surface and transmits messaging to the USB regarding the measured movement.

The USB, based on the received messaging, directs movement of a cursor on a display of the computer. The movement of the cursor is aligned with the movement of the thumb.

The device receives attachment to the hand via loops attached to user index finger and middle finger of the hand. The loops are seated in the first surface.

The device has buttons for right-click functionality and left-click functionality. The device transmits the messaging via Bluetooth technology.

In another embodiment, a system for providing a wireless, handheld pointing device is provided. The system comprises a device positioned against a palm of a user's hand. The system also comprises loops attached to a first surface of the device, the first surface facing toward the palm. The system also comprises a touchpad affixed to a second surface of the device, the second surface opposite the first surface and facing away from the palm receives contact from a thumb of the first hand. The system also observes persistent movement of the thumb across the touchpad. The system also transmits signaling describing observed persistent movement.

The movement of the thumb is associated with intended movement of a cursor on a display of a computer proximate the device. The device transmits the signaling to a universal serial bus (USB) device.

The USB device is attached to the computer and directs movement of the cursor in accordance with the received signaling. The loops attach to an index finger and a middle finger of the hand.

The device is portable and wireless and transmits the signaling using Bluetooth technology. The device has buttons for right-click functionality and left-click functionality.

In yet another embodiment, a method for wireless moving a cursor on a computer monitor comprising a wireless pointing device receiving attachment to a user hand. The method also comprises the device further receiving placement of a first surface of the device flush against a palm of the user hand. The method also comprises the device receiving contact and movement of a finger against a touchpad, the touchpad seated in a second surface of the device, the second surface opposite the first surface. The method also comprises the device recognizing the contact and movement as indicating a user intention to move a cursor on a display of a proximate computer. The method also comprises the device transmitting instructions directed to movement of the cursor on the display in accordance with the received contact and movement of the finger.

The method also comprises the device receiving attachment to the user hand via loops attached to user index finger and middle finger of the user hand. The method also comprises the device securing the loops to the first surface.

The method also comprises the device receiving the contact and movement from a thumb of the user hand. The method also comprises the device transmitting the instructions to a universal serial bus (USB) device. The USB device is inserted into a USB port of the proximate computer and directs movement of the cursor in accordance with the received instructions.

What is claimed is:

1. A system for promoting user manipulation of pointing device while operating keyboard, comprising:
    a computer;
    a universal serial bus (USB) device coupled to the computer;
    a handheld wireless pointing device with a first surface positioned against a palm of a user's hand that:
        receives tactile contact from a thumb of the hand on a touchpad on a second surface, the second surface opposite the first surface and facing away from the palm,
        measures movement of the thumb on the second surface, and
        transmits messaging to the USB regarding the measured movement.

2. The system of claim 1, wherein the USB, based on the received messaging, directs movement of a cursor on a display of the computer.

3. The system of claim 2, wherein the movement of the cursor is aligned with the movement of the thumb.

4. The system of claim 1, wherein the device receives attachment to the hand via loops attached to user index finger and middle finger of the hand.

5. The system of claim 4, wherein the loops are seated in the first surface.

6. The system of claim 1, wherein the device has buttons for right-click functionality and left-click functionality.

7. The system of claim 1, wherein the device transmits the messaging via Bluetooth technology.

8. A system for providing a wireless handheld pointing device, comprising:
    a device positioned against a palm of a user's hand;
    loops attached to a first surface of the device, the first surface facing toward the palm;
    a touchpad affixed to a second surface of the device, the second surface opposite the first surface and facing away from the palm, that:
        receives contact from a thumb of the user's hand,
        observes persistent movement of the thumb across the touchpad, and
        transmits signaling describing observed persistent movement.

9. The system of claim 8, wherein the movement of the thumb is associated with intended movement of a cursor on a display of a computer proximate the device.

10. The system of claim 8, wherein the device transmits the signaling to a universal serial bus (USB) device.

11. The system of claim 10, wherein the USB device is attached to a computer and directs movement of the cursor in accordance with a received signaling.

12. The system of claim 8, wherein the loops attach to an index finger and a middle finger of the hand.

13. The system of claim 8, wherein the device is portable and wireless and transmits the signaling using Bluetooth technology.

14. The system of claim 8, wherein the device has buttons for right-click functionality and left-click functionality.

15. A method for wireless moving a cursor on a computer monitor, comprising:
    a wireless pointing device receiving attachment to a user hand;
    the device further receiving placement of a first surface of the device flush against a palm of the user hand;
    the device receiving contact and movement of a finger against a touchpad, the touchpad seated in a second surface of the device, the second surface opposite the first surface;
    the device recognizing the contact and movement as indicating a user intention to move a cursor on a display of a proximate computer; and
    the device transmitting instructions directed to movement of the cursor on the display in accordance with the received contact and movement of the finger.

16. The method of claim 15, further comprising the device receiving attachment to the user hand via loops attached to user index finger and middle finger of the user hand.

17. The method of claim 16, further comprising the device securing the loops to the first surface.

18. The method of claim 15, further comprising the device receiving the contact and movement from a thumb of the user hand.

19. The method of claim 15, further comprising the device transmitting the instructions to a universal serial bus (USB) device.

20. The method of claim 19, wherein the USB device is inserted into a USB port of the proximate computer and directs movement of the cursor in accordance with a received instructions.

* * * * *